(12) United States Patent
Brewer et al.

(10) Patent No.: US 8,494,474 B1
(45) Date of Patent: Jul. 23, 2013

(54) DUAL BAND DIODE MIXER FOR RF DATA RECEIVER

(75) Inventors: Jerry Wayne Brewer, Pleasanton, CA (US); Sandra Nicole Kjono, San Diego, CA (US); Chris Michael Thomas, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 383 days.

(21) Appl. No.: 12/954,963

(22) Filed: Nov. 29, 2010

(51) Int. Cl.
*H04B 1/26* (2006.01)
(52) U.S. Cl.
USPC .......................................... 455/319; 455/330
(58) Field of Classification Search
USPC ................. 455/313, 323, 330, 333, 292, 293, 455/318, 319
See application file for complete search history.

(56) References Cited

U.S. PATENT DOCUMENTS

| 4,079,321 | A | 3/1978 | Strenglein |
| 4,306,311 | A | 12/1981 | Igarashi |
| 5,272,525 | A | 12/1993 | Borchardt |
| 6,078,802 | A | 6/2000 | Kobayashi |
| 6,774,699 | B1* | 8/2004 | Lin ............................... 327/355 |
| 2006/0040637 | A1 | 2/2006 | Kanaya |
| 2008/0081589 | A1* | 4/2008 | Kuo et al. ..................... 455/313 |
| 2011/0115566 | A1* | 5/2011 | Moon et al. ..................... 331/16 |

OTHER PUBLICATIONS

Mixer and Detector Diodes Application Note, Skyworks Solutions, 2008, pp. 1-18.
Waugh, Raymond, Notes on Differential Detector Circuits-Design Tip, Hewlett-Packard Company, Jun. 1999.
Kolinko, P. and Larson, L.E., Passive RF Receiver Design for Wireless Sensor Networks, IEEE Microwave Symposium, Jun. 2007, pp. 567-570.
Devlin, L., How to Design RF Circuits, IEEE Training Course, London, UK 2002.

* cited by examiner

*Primary Examiner* — Nguyen Vo
(74) *Attorney, Agent, or Firm* — Kyle Eppele; Stephen E. Baldwin

(57) ABSTRACT

In one preferred embodiment, the data receiver includes an input matching circuit for receiving an input RF data and forming an impedance matched signal and an amplifier circuit responsive to the impedance matched signal for forming an impedance transformed signal. The data receiver further includes a dual band RF tank/IF tank circuit forming respective RF and IF components and a diode mixer for mixing the impedance transformed signal with the dual band RF/IF components to form a mixed signal so that the RF tank filters the RF component from the mixed signal to form an IF tone signal as an output. The amplifier circuit preferably includes a source impedance control circuit for controlling high RF and IF impedances and a low noise amplifier (LNA) for forming, in conjunction with the source impedance control circuit, the impedance transformed signal.

11 Claims, 6 Drawing Sheets

At RF

At IF

DUAL BAND DIODE MIXER FOR RF DATA RECEIVER

FEDERALLY-SPONSORED RESEARCH AND DEVELOPMENT

This invention (Navy Case No. 100,808) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

BACKGROUND

Data receivers typically down-convert signals from a high frequency RF to a lower intermediate frequency IF. This is done to reduce the number of complex and power hungry RF circuits. This down-conversion is done using a mixer. Mixers may either be passive or active. Passive mixers are beneficial because they consume little or no power. However, they exhibit poor conversion gain, especially at small signal levels. Active mixers can achieve higher conversion gain, but use large amounts of power. For systems requiring very long battery life, the power consumption of an active mixer may be too high. For these applications, typically a passive diode mixer is used. Receivers using passive diode mixers typically have poor sensitivity to low conversion gain of the diode. Thus, the transmitted signal must have large power. This places restraints on the transmitter and message transmission distance.

SUMMARY

In one preferred embodiment, the data receiver includes an input matching circuit for receiving an input RF data and forming an impedance matched signal and an amplifier circuit responsive to the impedance matched signal for forming an impedance transformed signal. The data receiver further includes a dual band RF tank/IF tank circuit forming respective RF and IF components and a diode mixer for mixing the impedance transformed signal with the dual band RF/IF components to form a mixed signal so that the RF tank filters the RF component from the mixed signal to form an IF tone signal as an output. The amplifier circuit preferably includes a source impedance control circuit for controlling high RF and IF impedances and a low noise amplifier (LNA) for forming, in conjunction with the source impedance control circuit, the impedance transformed signal.

BRIEF DESCRIPTION OF THE DRAWINGS

Reference is now made to the drawings, where like components are represented by like reference numerals.

DETAILED DESCRIPTION OF THE EMBODIMENTS

A data receiver utilizing a dual band diode mixer can be used to lower the power and improve the sensitivity of the data receivers. Any receiver that performs conversion from high frequency RF to low frequency IF could use this invention for mixing. Applications can include locating (lost hiker, animal search, or valuables), AM radios, and remote controlled systems (garage door openers, radio controlled robotics, etc.), medical implants, as well as wake-up signals for remotely located devices.

The dual band diode mixer provides advantages over prior art mixers, which have several disadvantages. First, the input match is to the antenna's impedance, typically 50 ohms, meaning the input voltage to the diode is very small for low input power levels. The voltage across the diode should be made as large possible for conversion gain. Providing a larger impedance seen by the diode will improve conversion gain. Also, this inductor allows no DC current to flow through the diode. A DC bias greatly increases the conversion gain of the diode. A preferred solution is to allow DC biasing, present large impedances at both RF and IF, and allow for the impedances to be set independently.

Other passive solutions include using multiple diodes and mixing with more harmonics. These improvements are minimal. One possible way to improve the sensitivity of a passive mixer is to provide an amplifier before the mixer. However, if the amplifier's output impedance is matched to the input impedance of the mixer (typically 50 ohms), the sensitivity of the mixer will only improve at most by the gain of the amplifier. It is worth noting the added amplifier will cause retuning the IF portion due to the impedance of the amplifier (the RF and IF impedances are not independent).

Figure 1:
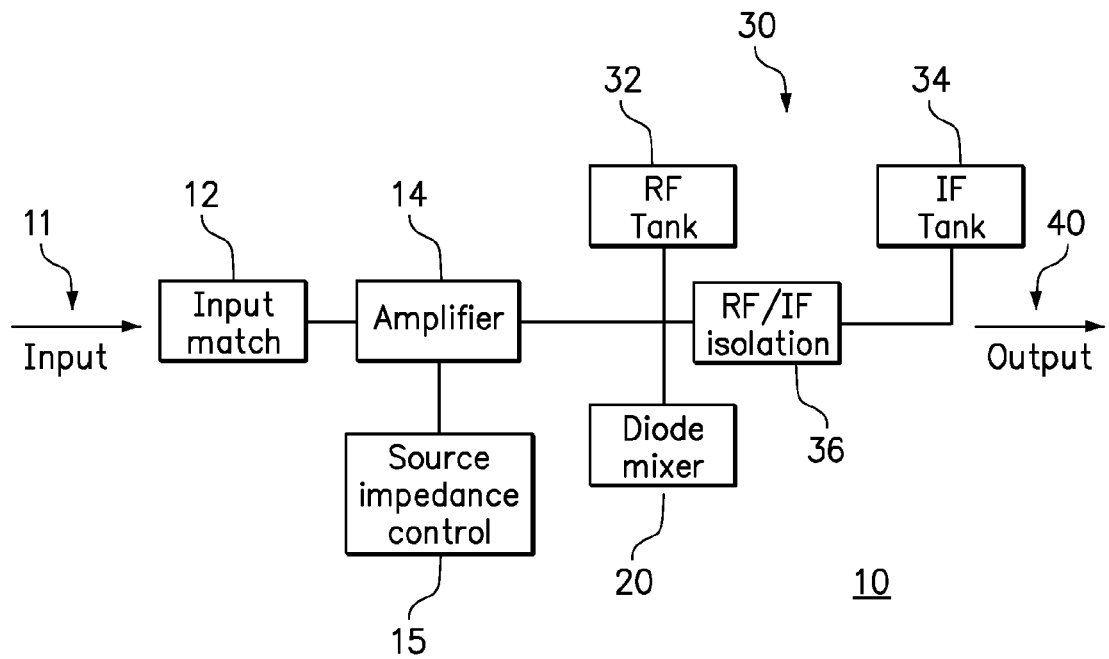
FIG. 1 shows a block diagram of a dual band diode mixer for an RF data receiver.

FIG. 1 shows a block diagram of a dual band diode mixer for an RF data receiver 10 which includes an input impedance matching circuit 10, amplifier 14, source impedance control 15, diode mixer 20, and a dual band tank configuration 30. The dual band tank configuration 30 includes an RF tank 32, IF tank 34 and RF/IF isolation 36. The data receiver 10 receives an RF data signal 11 and forms an IF tone signal output 40, as will now be described in more detail in conjunction with FIGS. 2A-2C.

Figure 2A:
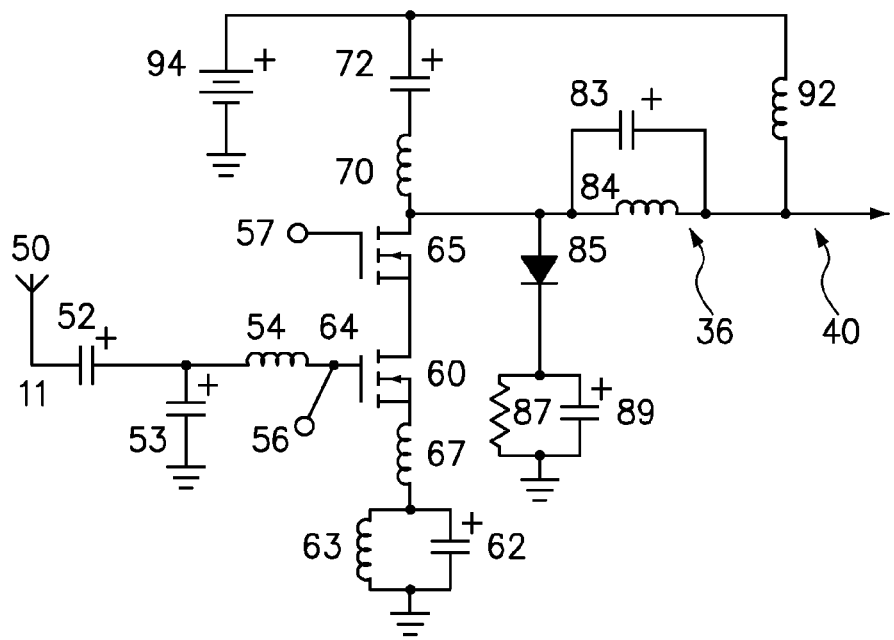
FIG. 2A shows a circuit diagram of a data receiver including a diode mixer for two-tone or AM signals.

FIG. 2A shows a data receiver 10 including a diode mixer for two-tone or AM signals. The data receiver includes an antenna 50 which receives an RF data signal 11 (modulated RF signal) for input to the input matching circuit 12 of FIG. 1.

The input circuit 12 includes DC blocking capacitor 52 which isolates the DC bias of the LNA (low noise amplifier) 60 from the LNA. Some LNAs require a DC bias, which would come from Node 56, The capacitor 52 blocks this DC voltage from the antenna 50, if required. Some antennas (typically active) cannot have a DC bias on their output.

The shunt capacitor 53 adjusts the input impedance of the LNA (if needed). The series inductor 54 adjusts the input impedance of the LNA (if needed). The node 56 for DC bias of LNA adjusts the gate-to-source voltage of the LNA (if DC bias is required). The node 57 for DC bias of LNA adjusts the gate-to-source voltage of the cascode transistor 65 for LNA.

The IF source impedance control circuit 15 is a resonant tank which is set to resonate at the IF frequency, providing several benefits. One, it increases the source impedance at IF. The results in lower noise gain from the input. Also, the output impedance of the LNA is increased at IF. These features provide higher conversion gain with lower noise. Since the resonate frequency of the tank is much lower than the RF, the tank has negligible effect on the RF performance.

The resonant capacitor 62 is one half of the IF resonate circuit for the source. This capacitor must be set with the resonant inductor 63 to resonate at IF. For the resonant inductor 63: the larger this inductor, the larger the conversion gain.

LNA (low noise amplifier) 60. This amplifier 60 increases the voltage across the mixing diode 85 to increase conversion gain. The benefit in using the LNA 60 in a high output impedance configuration (as opposed to usual 50 ohm) is that the diode 85 is provided a larger voltage for the same power. To illustrate this, consider a 0 dBm input with a 20 dB gain LNA. If the diode mixer is set with an input impedance of 50 ohms (prior art), the voltage across the diode is given by $$P_{IN} = 0 \rightarrow P_{diode} = 0 + 20 = 20 \rightarrow \frac{V^2}{R} = .1 \rightarrow V = 2.25V$$

Now consider the same input power and amplifier in the configuration of FIG. 2. If the output impedance is not 50 ohms, but large (10000 ohms) the voltage across the diode is much larger.

$$P_{IN} = 0 \rightarrow P_{diode} = 0 + 20 = 20 \rightarrow \frac{V^2}{R} = .1 \rightarrow V = 31.6V$$

This much larger voltage across the diode greatly increases the conversion gain by more than the gain of the amplifier.

LNA input transistor 64 sets the gain, noise figure, and current consumption of the LNA 60. The cascode transistor 65 improves the reverse isolation of the LNA 60. This is important for mixing circuits to prevent unwanted signals to leak to the antenna 50.

The source impedance control 67 for RF is an inductor which helps tune the input impedance of the LNA at RF (if needed). This inductor is also used to improve the stability of the circuit.

The RF resonant inductor 70 resonates at RF with the combined capacitance of the LNA 60 and mixing diode 85. If the combined capacitance of the LNA 60 and diode 85 is called $C_{Load}$, the value of the resonant inductor is given by $$L_{RF} = \frac{1}{w_{RF}^2 \cdot C_{Load}}$$

The DC blocking capacitor 72 blocks the DC current for the RF resonant inductor 70. This inductor 70 should be set to provide a small impedance at the RF frequency. Elements 72 and 70 are in series and may be interchanged.

The RF isolation circuit 36 filters the RF component of the mixed signal so only the IF tone is left. In a preferred embodiment, the circuit 36 is a LC resonant tank that is designed to resonate at a frequency greater than the IF and lower than the RF.

The resonant capacitor 83 is used with the resonant inductor 84 to resonate at a frequency greater than the IF and lower than the RF. The resonant inductor 84 is used with the resonant capacitor 83 described above.

The mixing diode 85 performs the mixing function as a result of the Taylor series expansion of the voltage dependence of the diode 85. The diode 85 should be a high performance diode with low equivalent resistance and capacitance.

The mixer bias setting resistor 87 is used to set the DC bias of the mixing diode 85 to provide a DC bias to increase the conversion gain of the diode 85.

The capacitor 89 is an RF short for the mixing diode 85. The capacitor 89 should be set to be a small impedance at RF. This provides an AC short for the diode for proper mixing.

The IF resonant inductor 92 resonates with the DC blocking capacitor 72 to provide a high impedance at IF. By providing a high impedance at IF, the down-converted tone is not shorted by a small impedance, but supported by the impedance of the tank. Note the resonant inductor 83 of the RF isolation circuit is in series with the IF resonant inductor 92. The RF isolation circuit 36 is preferably a small inductor compared to the IF resonant inductor and can be ignored. The value of the IF resonant inductor is set by $$L_{IF} = \frac{1}{w_{IF}^2 \cdot (C_{Load} + C_{DC\ Bloack})}$$

Note that both the IF and R tanks are set independently of each other, which is a significant improvements over previous efforts.

The voltage supply 94 and circuit output 40 shown in FIG. 2A are self-explanatory.

Figure 2B:
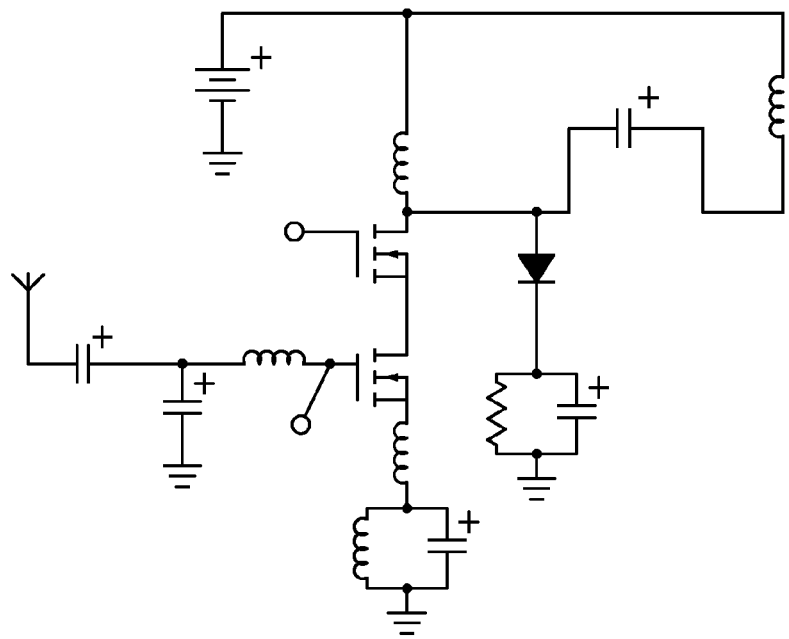
FIG. 2B shows an equivalent RF circuit for the diagram shown in FIG. 2A.
Figure 2C:
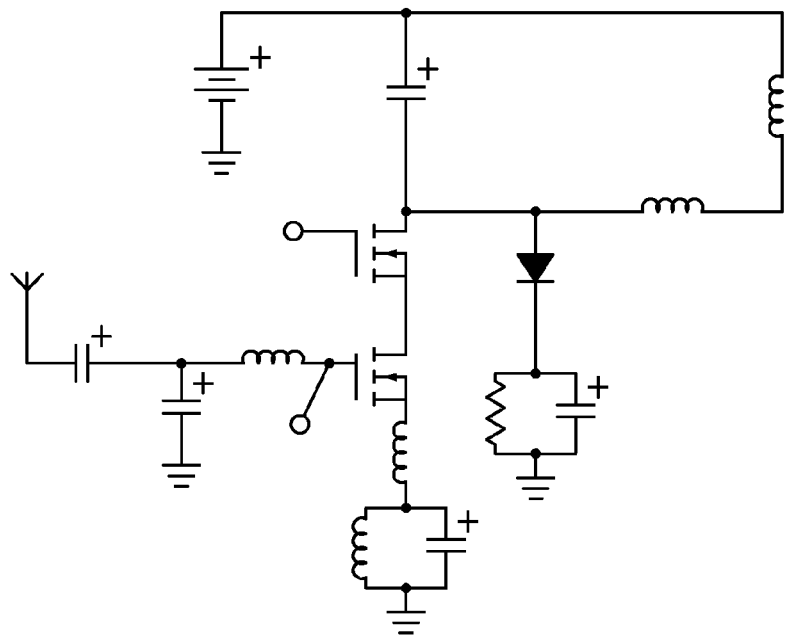
FIG. 2C shows an equivalent IF circuit for the diagram shown in FIG. 2A.

FIGS. 2B and 2C show an equivalent RF circuit and an equivalent IF circuit, respectively, for the data receiver diagram shown in FIGS. 1 and 2A.

In a preferred embodiment shown in FIGS. 1 and 2A, circuit 36 resonates at a frequency greater than IF but less than RF. The idea is that at IF, circuit 36 effectively reduces to the inductor. At RF, circuit 36 reduces to the capacitor. If circuit 36 resonates at IF, the mixed IF tone will be "blocked" by the large impedance and will be attenuated at the output. In that preferred embodiment, the resonant frequency of circuit 36 should also be lower than the RF frequency.

At RF, the circuit has passed its resonant frequency, and effectively reduces to the capacitor. This isolates any load capacitance from the RF tank by putting the load capacitor in series with this capacitor in circuit 36, since capacitors in series have a reciprocal relationship. Thus, if the capacitor in circuit 36 is small (for example, around 100 fF), then load capacitance can be fairly large (>10 pF) without effecting the RF tank at all.

This is very desirable because the load capacitance tunes the IF tank. The IF tank can be tuned without adjusting the RF tank's tune.

At both frequencies (RF and IF), the circuit effectively reduces to an LC tank at the node of the diode. The inductor's impedance cancels the impedance of the capacitor, leaving the diode seeing a large impedance, which is the beauty of this circuit. At RF and IF, the circuit reduces to simple tanks that are tuned independently of each other.

Figure 3:
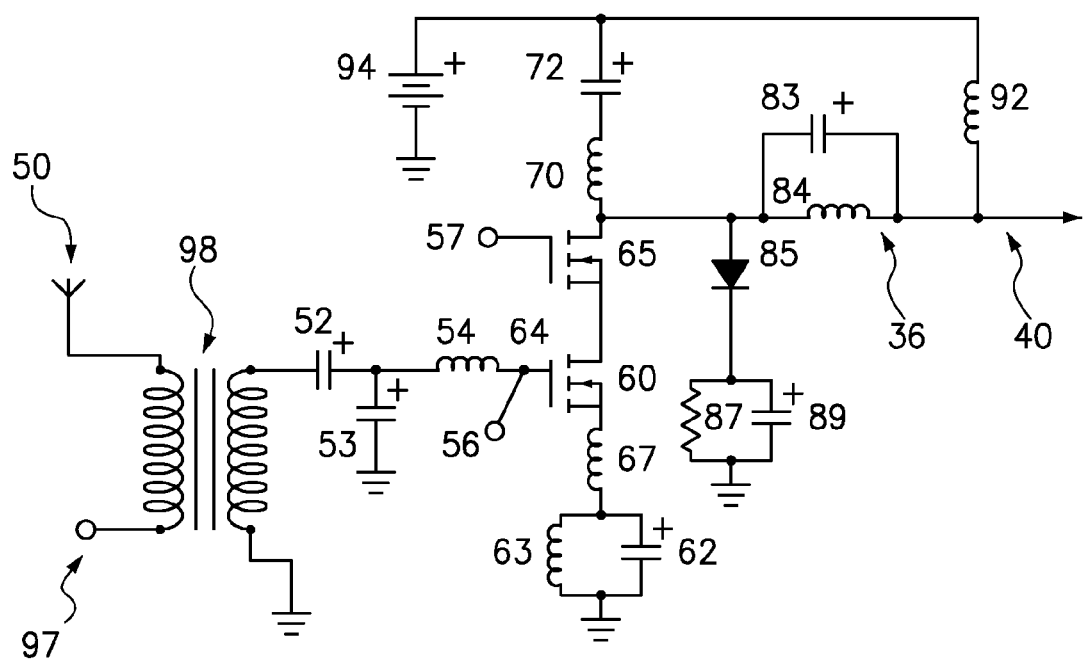
FIG. 3 shows a circuit diagram of a data receiver for mixing using a reference oscillator.

FIG. 3 shows an embodiment of a mixer circuit configured to perform mixing using a reference oscillator. The analysis of FIG. 3. circuit is identical to that of FIG. 2A with the additions of the node for reference oscillator 97 and the power transformer 98.

The dual band diode mixer provides many benefits: first, the invention allows DC biasing of the diode, increasing conversion gain. Second, the RF and IF tanks are set independently of each other. Thus the RF or IF tank can be tuned without disturbing the other match. Also, the output impedance of the amplifier is large at both RF and IF. This means both the RF and IF tone are supported by a large impedance. This maximizes conversion gain by presenting a larger voltage across the diode. Since the conversion gain of the diode is exponential with voltage, the conversion gain is increased by more than the gain of the amplifier. These advantages are shown in the following circuit simulation.

Figure 4:
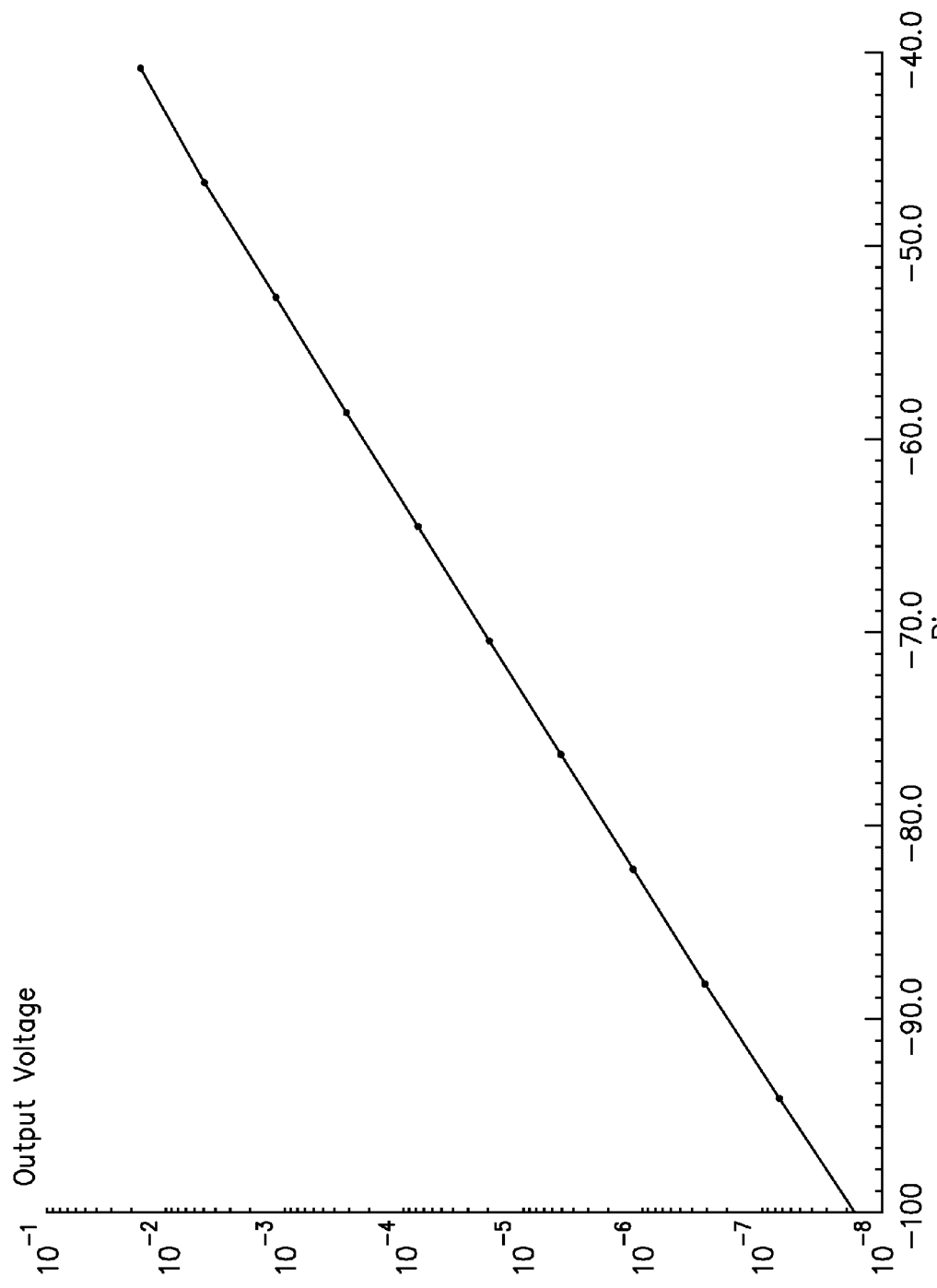
FIG. 4 shows a diagram of output voltage (log scale) of the improved passive mixer vs input power.

FIG. 4 shows a circuit simulation of output voltage (log scale) of improved passive mixer vs. input power. The circuit configuration of FIG. 2 is a significant improvement over the previous effort. The conversion gain is considerably higher as evident by the increased slope of the curve. This is due to the dual resonant tanks supported the down-converted tone as well as the ability to DC bias the diode. Prior approaches exhibit very poor conversion gain in which slope of the curve is low. These prior approaches require large input power to achieve detectable voltage, and thus, sensitivity is very poor.

FIG. 4 shows the huge improvements of the circuit of FIG. 2. The circuit simulation includes a 33 dB amplifier, but the conversion gain is improved by 50 dB. The conversion gain can improve by more than the gain of the amplifier due to the exponential relationship of the diode. This large conversion gain—even at very small input power—allows the diode mixer to be used in applications that require high sensitivity. Also, the noise figure of this circuit is improved dramatically by amplifying the input signal while only adding small amounts of noise (typically 1-3 dB). This allows the mixing signal to be larger than the inherent noise of the diode, increasing sensitivity.

This mixer improves receiver performance by improving sensitivity, noise figure, and power consumption.

Figure 5:
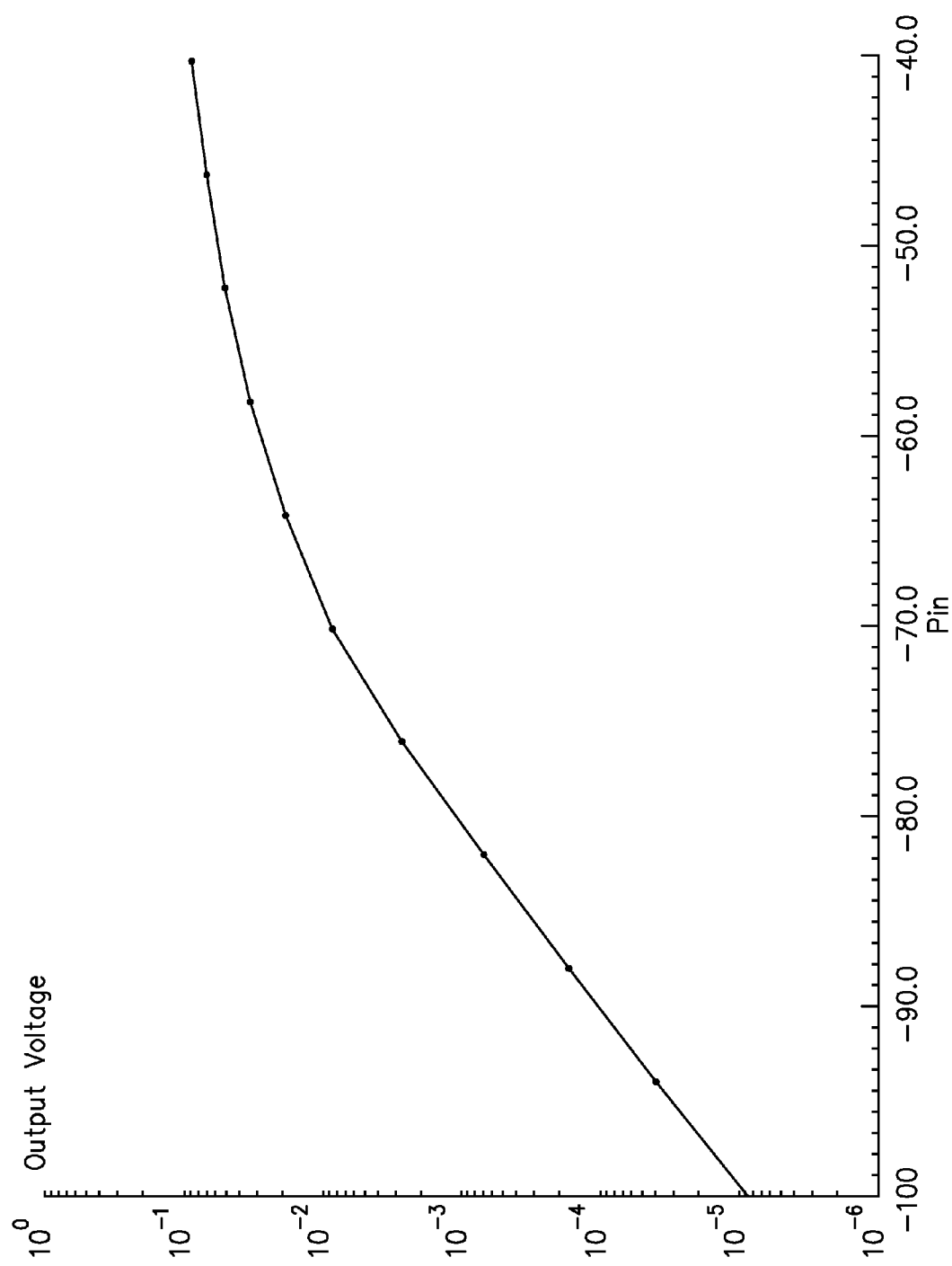
FIG. 5 shows a diagram of output voltage (log scale) of improved mixer circuit vs input power.

FIG. 5 shows a diagram of output voltage (log scale) of improved mixer circuit vs input power.

In various other embodiments, the mixer can down-convert AM signals. The mixer can also be used to down-convert two-tone signals. The mixer can also be used in down-convertors with a reference oscillator by using a transformer. The mixer can also be used without the amplifier by using an impedance transformation. This provides large impedances at RF and IF that can set independently. This configuration also allows DC biasing. However, the conversion is greatly reduced by eliminating the amplifier.

Figure 6:
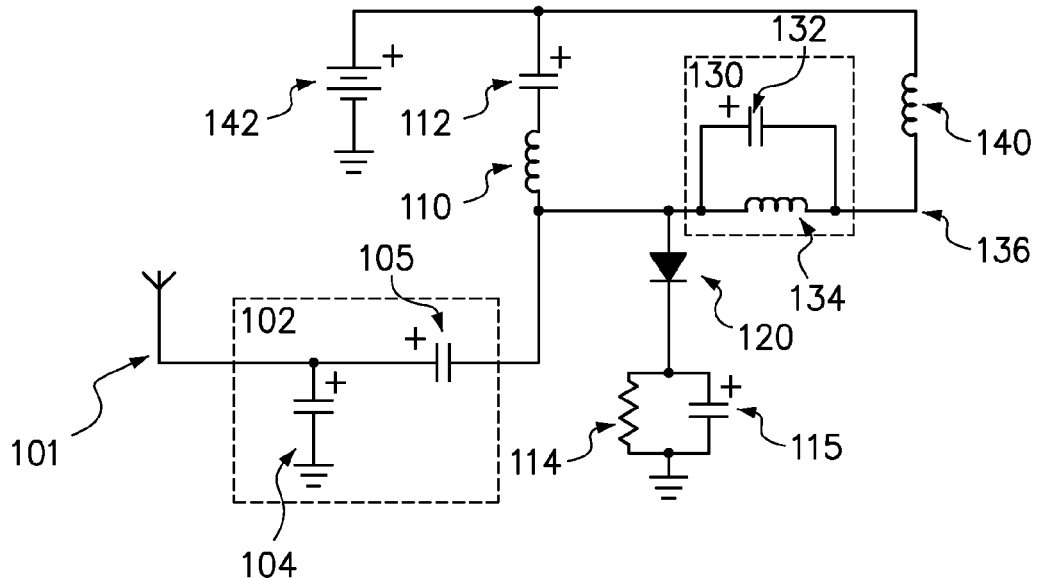
FIG. 6 shows an alternative configuration of AM or two-tone signals.

FIG. 6 shows an alternative configuration 100 for AM or Two-tone signals.

The data receiver 100 in FIG. 6 includes antenna 101 with an AM or two-tone signal input to input matching circuit 102. In the input matching circuit 102, capacitors 104 and 105 match the circuit 102 to the impedance of antenna 101.

The RF resonant inductor 110 resonates at RF with the combined capacitance of the mixing diode and the input match capacitors. The value of the resonant inductor is given by $$L_{RF} = \frac{1}{w_{RF}^2 \cdot (C_{Load} + C_{104} \parallel C_{105})}$$

The DC blocking capacitor 112 blocks the DC current for the RF resonant inductor 134. This inductor 134 should be set to provide a small impedance at the RF frequency.

Mixer bias setting resistor 114 is used to set the DC bias of the mixing diode 120, providing a DC bias increases the conversion gain of the diode 120.

Capacitor 115 is an RF short for the mixing diode 120. The capacitor 115 should be set to be small impedance at RF, providing an AC short for the diode for proper mixing.

Mixing diode 120 performs the mixing function as a result of the Taylor series expansion of the voltage dependence of the diode. The diode 120 should be a high performance diode with low equivalent resistance and capacitance.

RF isolation circuit 130 filters the RF component of the mixed signal so only the IF tone is present. The circuit 130 is a LC resonant tank that is designed to resonate at a frequency greater than the IF and lower than the RF.

Resonant capacitor 132 is used with the resonant inductor 134 to resonate at a frequency greater than the IF and lower than the RF.

The output 136 of circuit 100 is self-explanatory.

{Changed output node 134 to 136. 134 is used for the inductor.}

IF resonant inductor 140 resonates with the DC blocking capacitor 112 to provide a high impedance at IF. By providing a high impedance at IF, the down-converted tone is not shorted by a small impedance, but supported by the impedance of the tank. Note the resonant inductor 134 of the RF isolation circuit is in series with the IF resonant inductor 140: The RF isolation circuit is usually a small inductor compared to the IF resonant inductor and can be ignored. The value of the IF resonant inductor is set by $$L_{IF} = \frac{1}{w_{IF}^2 \cdot (C_{Load} + C_{DC\ Bloack} + C_{2a} \parallel C_{2b})}$$

Note that both the IF and RF tanks are set independently of each other. This is big improvements over previous efforts.

The voltage supply 142 is self-explanatory.

Figure 7:
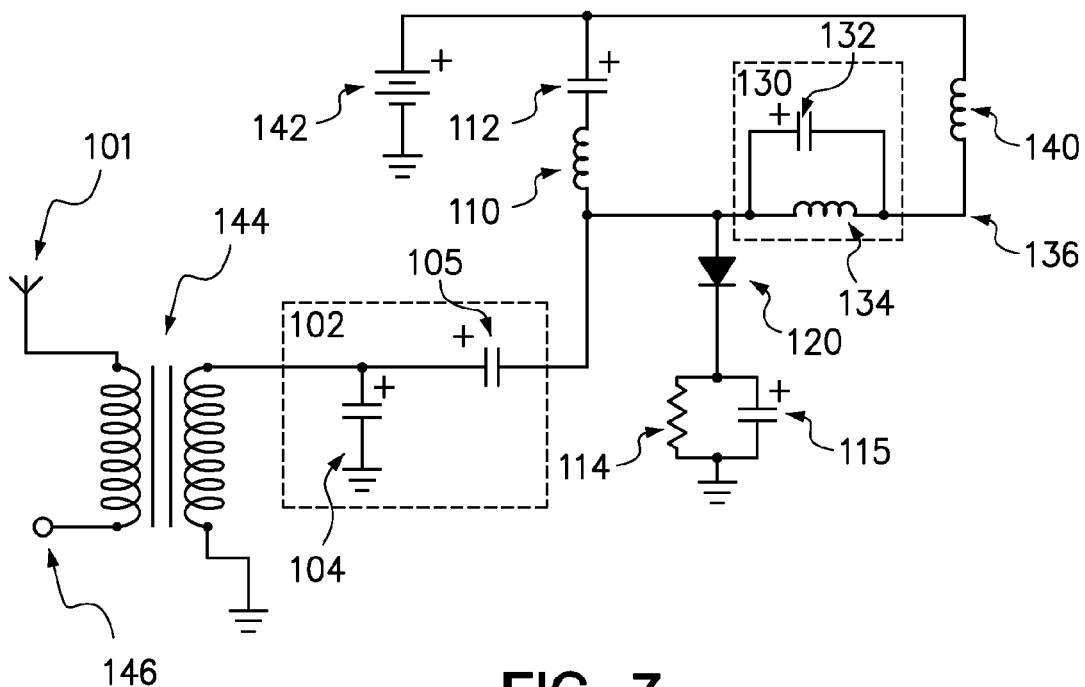
FIG. 7 shows an alternative configuration of mixing using a reference oscillator.

This configuration can be used to down-convert using a reference oscillator. This is shown in FIG. 7, which shows an alternative configuration for mixing using a reference oscillator. The operation of the circuit is identical as the FIG. 6 with the addition of the power transformer 144 and the node for reference oscillator 146.

From the above description, it is apparent that various techniques may be used for implementing the concepts of the present invention without departing from its scope. The described embodiments are to be considered in all respects as illustrative and not restrictive. It should also be understood that system is not limited to the particular embodiments described herein, but is capable of many embodiments without departing from the scope of the claims.

What is claimed is:

1. A data receiver comprising:
    an input matching circuit for receiving an input RF two-tone data signal and forming an impedance matched signal;
    an amplifier circuit responsive to the impedance matched signal for forming an impedance transformed signal;
    a dual band RF tank/IF tank circuit forming respective RF and IF components corresponding to the two-tone signal; and
    a diode mixer for mixing the impedance transformed signal with the dual band RF/IF components to form a mixed signal so that the RF tank filters the RF component from the mixed signal to form an IF tone signal as an output.

2. The data receiver of claim 1 where the amplifier circuit includes a source impedance control circuit for controlling high RF and IF impedances and a low noise amplifier (LNA)

for forming, in conjunction with the source impedance control circuit, the impedance transformed signal.

3. The data receiver of claim 2 where the LNA (low noise amplifier) increases the input voltage across the mixing diode to increase conversion gain.

4. The data receiver of claim 3 including a first tunable IF resonant tank circuit for resonating at the IF frequency to increase source impedance at the IF frequency resulting in lower noise gain from the input and increasing the output impedance of the LNA and a second tunable RF resonant tank circuit tunable independently of the IF resonant tank for filtering the RF component from the mixed signal so that only the IF component remains to form an IF output signal.

5. The data receiver of claim 4 wherein the output impedance of LNA amplifier is large at both RF and IF so that RF and IF tones are supported by large impedance to maximize conversion gain, presenting larger voltage across the mixer diode.

6. The data receiver of claim 5 including DC biasing of the diode mixer to increase conversion gain.

7. The data receiver of claim 6 including a reference oscillator and a power transforming for receiving the RF data signal.

8. The data receiver of claim 7 where the resonant frequency of the RF tank is greater than the IF frequency and less than the RF frequency.

9. A data receiver comprising:
   an input matching circuit for receiving an input RF modulated data signal and forming an impedance matched signal;
   a dual band RF tank/IF tank circuit forming respective RF and IF components; and
   a diode mixer for mixing the impedance matched signal with the dual band RF/IF components to form a mixed signal corresponding to the input RF modulated data signal so that the RF tank filters the RF component from the mixed signal to form an IF tone signal as an output.

10. The data receiver of claim 9 including a reference oscillator and a power transformer for receiving the RF modulated data signal.

11. A data receiver comprising:
    an input matching circuit for receiving an input RF two-tone data signal and forming an impedance matched signal;
    a low noise amplifier circuit responsive to the impedance matched signal for forming an impedance transformed signal;
    a dual band RF tank/IF tank circuit forming respective RF and IF components corresponding to the RF two-tone data signal where the RF and IF tanks are tunably independent of each other;
    a diode mixer for mixing the impedance transformed signal with the dual band RF/IF components to form a mixed signal so that the RF tank filters the RF component from the mixed signal to form an IF tone signal as an output;
    where the low noise amplifier circuit includes a source impedance control circuit for controlling high RF and IF impedances and a low noise amplifier (LNA) for forming, in conjunction with the source impedance control circuit, the impedance transformed signal and where the low noise amplifier increases the input voltage across the mixing diode to increase conversion gain and including DC biasing of the diode mixer to increase conversion gain.

* * * * *